United States Patent
Thomson

Patent Number: 6,117,296
Date of Patent: Sep. 12, 2000

[54] ELECTRICALLY CONTROLLED CONTRACTILE POLYMER COMPOSITE

[76] Inventor: Timothy Thomson, 124 Main St., West Newbury, Mass. 01985

[21] Appl. No.: 09/121,075

[22] Filed: Jul. 21, 1998

[51] Int. Cl.[7] .................................................. C25B 9/00
[52] U.S. Cl. .............................. 204/607; 204/457; 623/14
[58] Field of Search .................. 204/296, 450.553, 204/607, 601, 602, 295; 205/450; 623/14

[56] References Cited

U.S. PATENT DOCUMENTS

| | | | |
|---|---|---|---|
| 4,797,190 | 1/1989 | Peck | 204/296 |
| 5,079,535 | 1/1992 | Neuman et al. | 338/2 |
| 5,100,933 | 3/1992 | Tanka . | |
| 5,250,167 | 10/1993 | Adolf . | |
| 5,389,222 | 2/1995 | Shahinpoor . | |
| 5,408,999 | 4/1995 | Singh et al. | 128/634 |
| 5,423,739 | 6/1995 | Phipps et al. | 604/20 |
| 5,525,356 | 6/1996 | Jevne et al. | 424/484 |
| 5,558,633 | 9/1996 | Phipps et al. | 604/20 |
| 5,674,295 | 10/1997 | Ray et al. | 623/17 |
| 5,736,590 | 4/1998 | Rasmussen | 523/113 |

*Primary Examiner*—Kishor Mayekar
*Attorney, Agent, or Firm*—William B. Ritchie

[57] ABSTRACT

An electrically controlled polymer composite which, when acted upon by an electric current, contracts or relaxes. It can also serve as a smart drug delivery device. The polymer composite is a series of hydrogel layers, each of which serve a particular purpose. A nonionic layer serves as a reservoir for an ionic salt while layers on either side can be anionic hydrogels and cationic gel. The invention can include an imbedded strain gauge by which the contractions or relaxations are monitored and controlled. The device is capable of being controlled by a computer with data acquisition and control capabilities.

20 Claims, 6 Drawing Sheets

ELECTRICALLY CONTROLLED CONTRACTILE POLYMER COMPOSITE

BACKGROUND OF THE INVENTION

1. Field of the Invention

This invention relates to an electrically controlled polymer system that contracts and relaxes when acted upon by an electric current. This makes it appropriate for use as an artificial skeletal or cardiovascular muscle or to replace hydraulic, servomotors or stepper motors in robotics. In the case of disease or injury, the occasion arises when human muscles require replacement or repair. In the case of robotic devices, the size, weight and power requirements of current devices is thought to be a disadvantage.

2. Description of the Prior Art

It is know that certain hydrophilic ionic polymers contract or relax in response to changes in the environment in which they exist. W. Kuhn, et al, "Reversible Dilation and Contraction by Changing the State of Ionization of High Polymer Acid Networks", Nature, Vol. 165, No. 4196, pp 514–516, (1950) discussed their work with a three-dimensional polymer network made by reacting Polyacrylic Acid with Polyvinyl Alcohol in various ratios. The result of this reaction was a water insoluble, but swellable material. A material of this type, insoluble but swellable, is commonly referred to as a hydrogel. They showed that a hydrogel of this type contracted when the pH was lowered, the temperature was raised or the ionic strength was increased.

The behavior of gels of this type in an electric field was discussed by T. Tanaka et al., "Collapse of Gels in an Electric Field", Science, Vol. 218, pp 457–469, (1982) and in subsequent patents including U.S. Pat. No. 5,100,933.

In his patent Tanaka et al. discusses the contractile character of a hydrolyzed polyacrylamide gel immersed in an acetone/water solution. They discuss the contractile phenomenon as the water to acetone ratio is changed. They further state that when an electric current is passed through the gel, it contracts.

Adolf et al. (U.S. Pat. No. 5,250,167) and subsequently, Shahinpoor (U.S. Pat. No. 5,389,222), discuss a device which they refer to as an actuator that uses the phenomenon of the Tanaka patent. Again, a hydrogel material is immersed in an ionic solution. The material is mounted such that current is passed through the solution and into the gel. It is also mounted so that as the gel contracts, the force is transferred to a device outside the actuator.

SUMMARY OF THE INVENTION

The present invention is a contractile apparatus, utilizing a polymer composite and an electrical conductor that is capable of contracting or relaxing when operated upon by an electric current. In its most basic form, the polymer composite of the present invention comprises a nonionic polymer hydrogel containing a soluble and ionizable salt, and at least one ionic hydrogel in intimate contact with the nonionic hydrogel. In operation, the electrical conductor is placed in conductive relationship with the hydrogels and current of a predetermined polarity is passed through the hydrogels to effect a desired ionic migration and cause the polymer to either contract or relax. In the preferred embodiment, the ionic polymer hydrogels comprise an anionic and a cationic hydrogel disposed on opposite sides of the nonionic hydrogel such that cations, such as $Na^+$, $Ca^{++}$, and $Al^{+++}$, from the ionizable salt are passed to the anionic hydrogel and anions, such as $SO4^{--}$, $PO4^{---}$, and $Cl^-$, from the ionizable salt are passed to the cationic hydrogel.

In some embodiments, the polymer composite is formed into a substantially cylindrical rod comprising a metal core coated with layers of the cationic polymer hydrogel, the nonionic hydrogel and the anionic polymer hydrogel respectively and having an exterior conductive coating that acts as the cathode. Other embodiments utilize a sensor, such as a colorimetric device or strain gauge to monitor the state of the composite and a controller for controlling the electrical current to the composite. In still other embodiments, a plurality of polymer composites are utilized with the electrical conductor being placed in electrical communication with each polymer composite such that they may be controlled simultaneously.

Now therefore, it is an aspect of the invention to provide a contractile apparatus for use as an artificial skeletal or cardiovascular muscle.

It is a further aspect of this invention to provide a contractile apparatus for use as an actuator for mechanical robots.

It is another aspect of this invention to provide a contractile apparatus that expels water during contraction making it suitable for use as a drug delivery device.

It is another aspect of this invention to provide a contractile apparatus for use as an actuator.

It is a still further aspect of this invention to provide a contractile apparatus for use as a strain sensor similar to those used in electronic pressure measuring devices.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE DRAWINGS

The present invention is a contractile apparatus, utilizing an electrically controlled polymer composite, that may be made to contract and relax by changing the ionic strength of the polymer.

Figure 1:
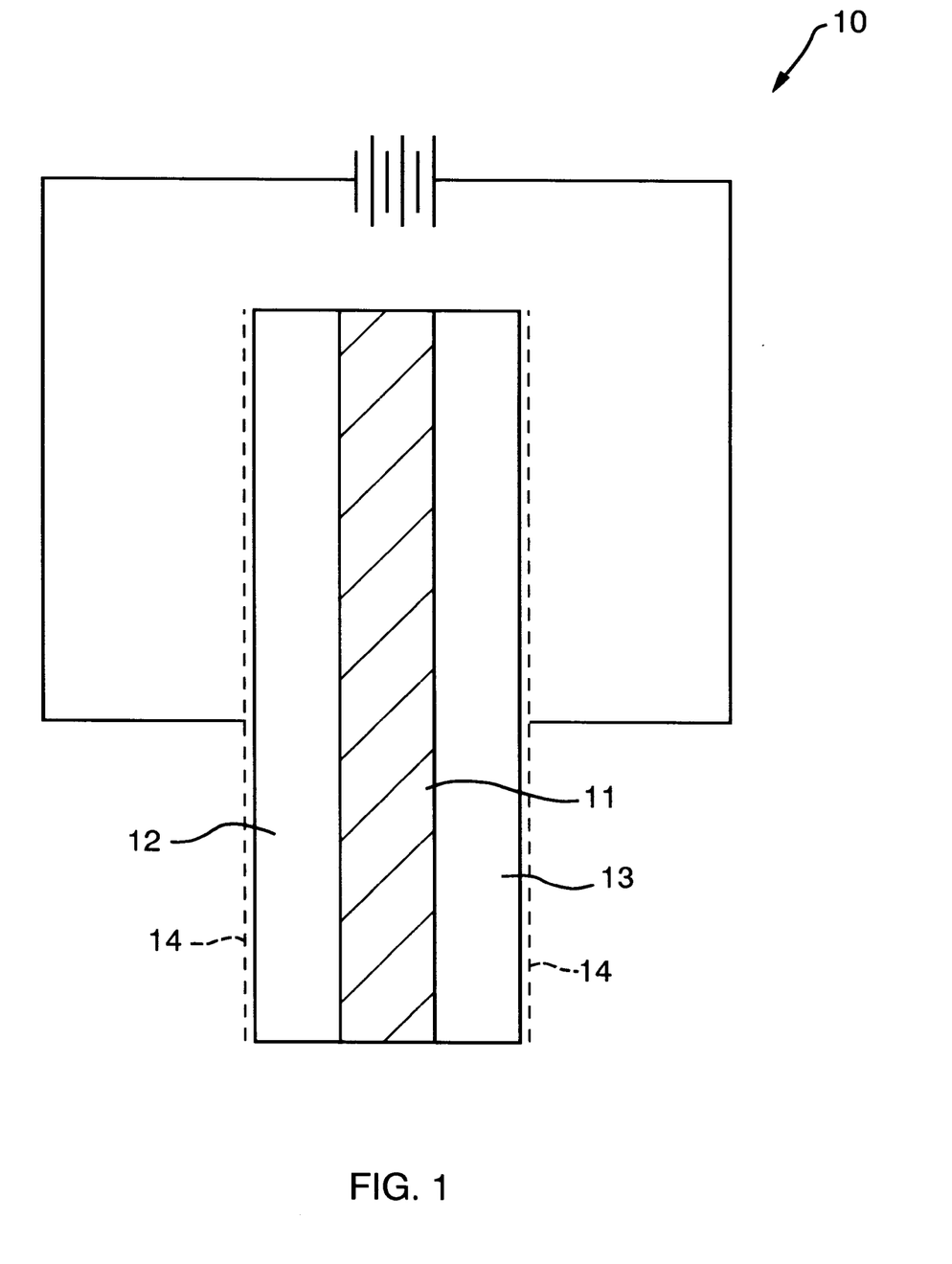
FIG. 1 is a schematic view of the preferred embodiment of the contractile apparatus of the present invention utilizing a cationic polymer hydrogel and an anionic polymer hydrogel.

Referring first to FIG. 1, a schematic of an apparatus utilizing the composite of the present invention is shown.

The apparatus 10 comprises a nonionic hydrogel core 11 containing a soluble and ionizable salt, an anionic hydrogel 12, a cationic hydrogel 13, and a flexible conductor 14 through which an electric current is applied. Experimentation has revealed that nonionic gels do not contract or relax with changes in the ionic strength to the same degree as ionic gels. Thus, if a direct current is applied with polarity as shown, i.e. with the cationic hydrogel 13 serving as the anode and the anionic hydrogel 12 serving as the cathode, the cation held by the ionizable salt will move from the nonionic hydrogel core 11 into the anionic hydrogel 12 causing it to contract. Simultaneously, the anion held by ionizable salt in the nonionic hydrogel core 11 will move into the cationic hydrogel 13 causing it to also contract. By reversing the polarity of the current, both ions may be made to migrate back into the nonionic hydrogel core 11 causing both the anionic hydrogel 12 and the cationic hydrogel 13 to relax.

Figure 2:
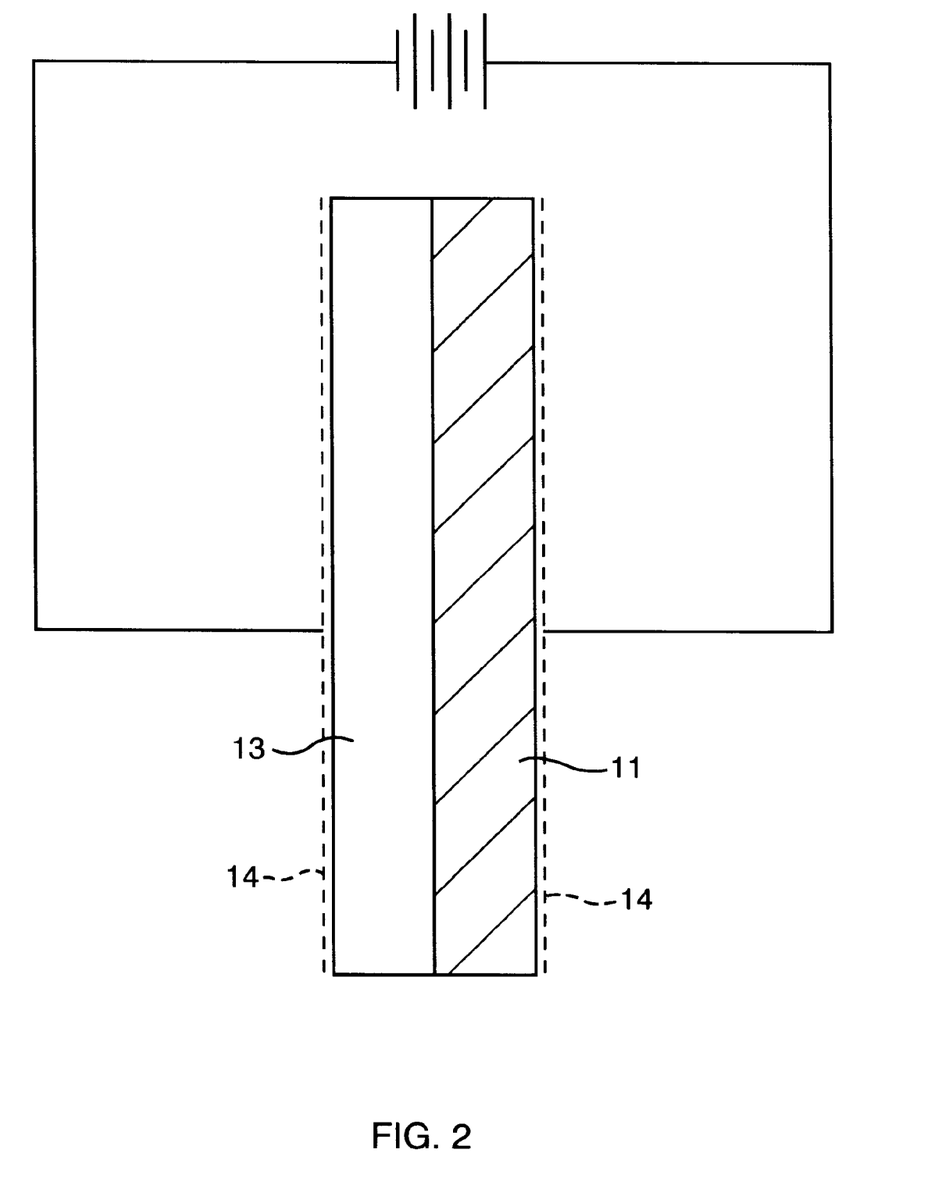
FIG. 2 is a schematic view of an alternate embodiment of the contractile apparatus of the present invention utilizing a single ionic polymer hydrogel.

In this example, three layers are shown, but those having ordinary skill in the art will recognize that a composite comprising only two layers would produce the same effect. Referring now to FIG. 2, such an embodiment is shown. The two-layer embodiment is made up of a nonionic hydrogel 11 containing a soluble, ionic salt, in intimate contact with an ionic hydrogel 13, which may be either an anionic hydrogel or a cationic hydrogel. As was the case with respect to the embodiment of FIG. 1, passing a current through conductor 14 will result in a contraction or relaxation response appropriate to the polarity of the electric current passed through it.

The hydrogels described with reference to FIGS. 1 and 2 are known in the art and may be prepared in accordance with known methods. For example, an anionic hydrogel suitable for use in this invention may be prepared according to the teachings of Kuhn et. al. in their article "Reversible Dilation and Contraction by Changing the State of Ionization of High-Polymer Acid Networks", Nature, vol. 165, no. 4196, pgs. 514–516 (April 1950), incorporated herein by reference. A cationic hydrogel suitable for use in the present invention may be prepared according to the teachings of S. Katayama and A. Ohate, Macromolecules, Vol. 18, p2782, (1985), incorporated herein by reference. A nonionic hydrogel suitable for use in the present invention may be polyacrylamide crosslinked with bisacrylamide, according to the procedure described in Tanaka et al., U.S. Pat. No. 5,100,933, incorporated herein by reference. The preferred embodiment of the present invention utilizes a nonionic hydrogel produced using a commercial grade of hydrophilic polyurethane foam due to the elasticity of such foams, though dense polyurethane may also used to achieve similar results. Regardless of the nonionic hydrogel utilized, suitable soluble ionic salts for disposal within the nonionic hydrogel include sodium chloride, copper sulfate or aluminum sulfate. In embodiments utilizing such salts, an electric potential of about 2 volts per centimeter is suitable to create the desired mobilization. It should be noted, however, that the particular chemistries of the hydrogels and salts discussed herein are cited merely to illustrate particular embodiments of the invention and that other suitable hydrogels or salts will be readily apparent to those of ordinary skill in the chemical arts.

In order to control the effect described herein, the application of a direct current will result in a contraction or relaxation of the ionic gels. However, due to the ionic affinities of the hydrogels employed, the cessation of direct current will not stop the migration of ions and hence not offer proper control. This ionic control problem is inherent with the systems discussed in the Tanaka et. al., Adolf et. al., and Shahinpoor patents (U.S. Pat. Nos. 5,100,933; 5,250,167; and 5,389,222 respectively). To overcome this problem, some embodiments of the present invention utilize alternating current to prevent or retard the migration of ions. By cyclically reversing the direction of the current flowing through the apparatus, the ions may be made to migrate back and forth in a predetermined manner to achieve a desired near steady state condition. In addition, the application of a nonsymmetrical alternating waveform can be used to counter the natural tendency of the ionic salt to migrate to the ionic gels. Thus different waveforms may be developed to achieve the desired effect in polymer composites composed of different materials and having different ionic affinities.

Beyond the application of an alternating current control, an additional device for measuring the state of the composites may be attached to an electrical controller to control the voltage supplied to the composite. In some embodiments, this device is a calorimetric device adapted to monitor the concentration of salt in the gels based upon changes in gel color or turbidity. Such devices are common in the chemical arts and may be readily adapted to provide a suitable signal to an electrical controller.

Figure 3A:
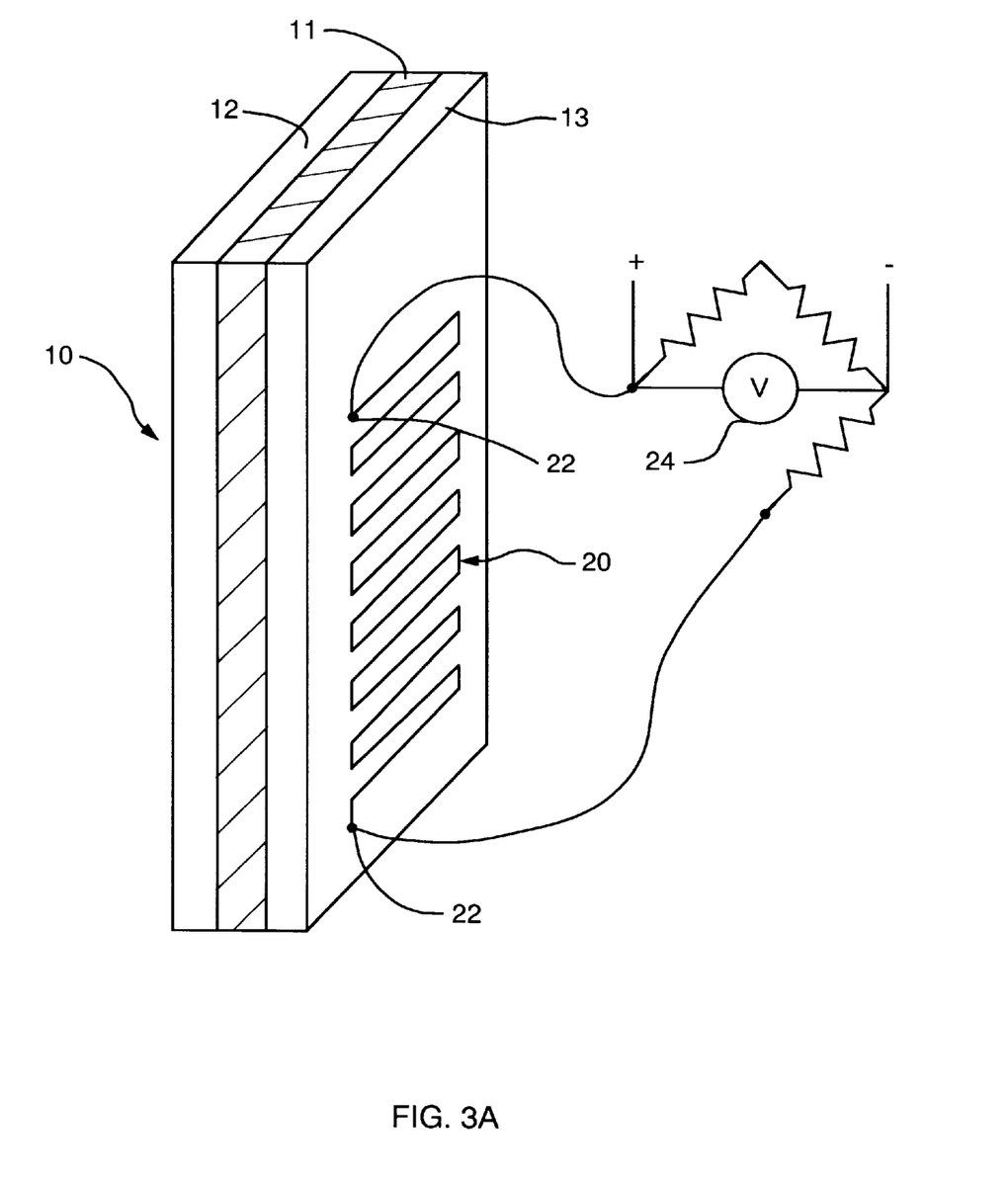
FIG. 3A is schematic view of an embodiment of the contractile apparatus of the present invention utilizing a strain gauge to monitor contractions.
Figure 3B:
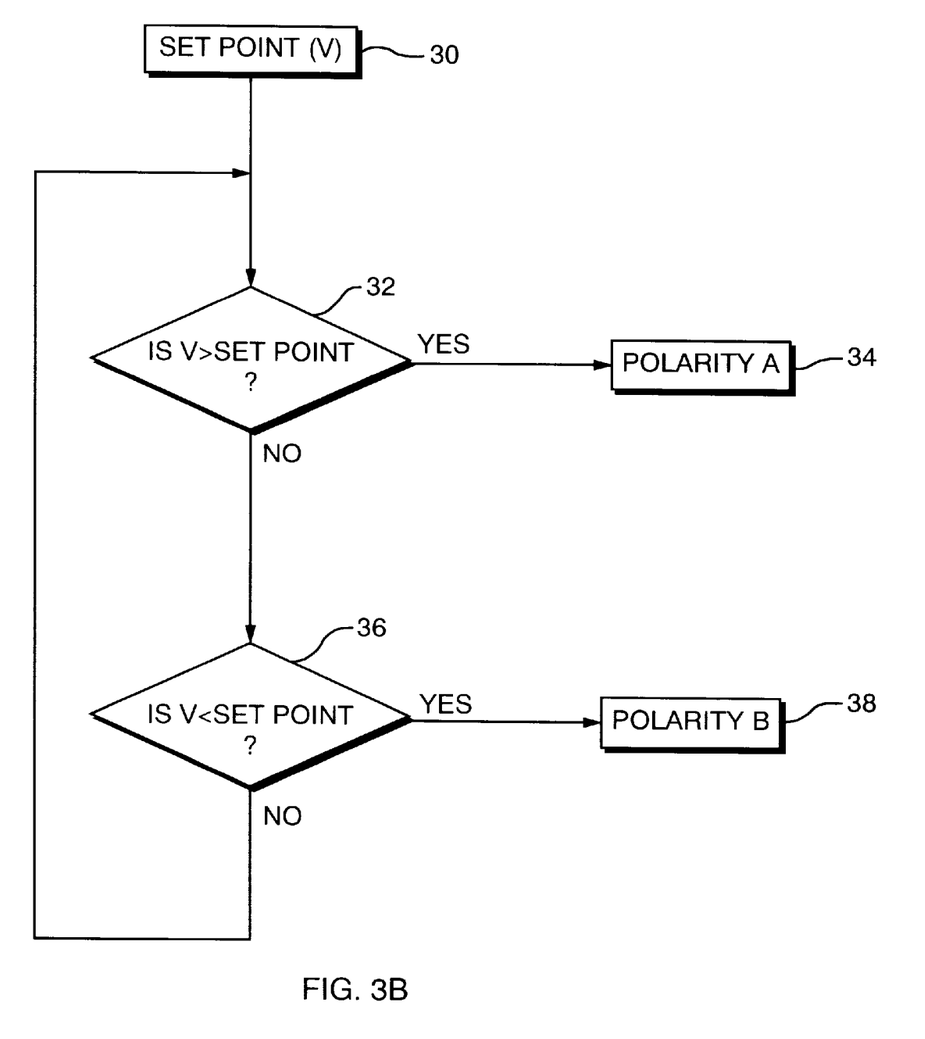
FIG. 3B is a block diagram of a control circuit for controlling said contractile apparatus based upon an output from the strain gauge of FIG. 3A.

The preferred embodiment, utilizes an imbedded electronic strain gauge to monitor the length of the gel system. These strain gauges, conventionally built into Wheatstone bridge circuits, respond to changes in length by changing the resistance through the gauge. Such a circuit 20 is shown in FIG. 3A. Circuit 20 is disposed on one layer of the composite 10 such that the end connections 22 move in conjunction with contraction or relaxation of the composite 10. Movement of the end connections 22 changes the resistance through the circuit 20 and is read by a voltmeter 24. Voltmeter 24 may be further attached to an electrical controller to control the contractions or relaxations of the composite 10. As shown in FIG. 3B, in such an arrangement the electrical controller (not shown) would be programmed to a predetermined set point 30 and would monitor the voltage through the circuit 10. If the voltage is greater than the set point 32 then the controller will maintain a first polarity 34. If the voltage is less than the set point 36 then the controller will change reverse the polarity 38.

Figure 4:
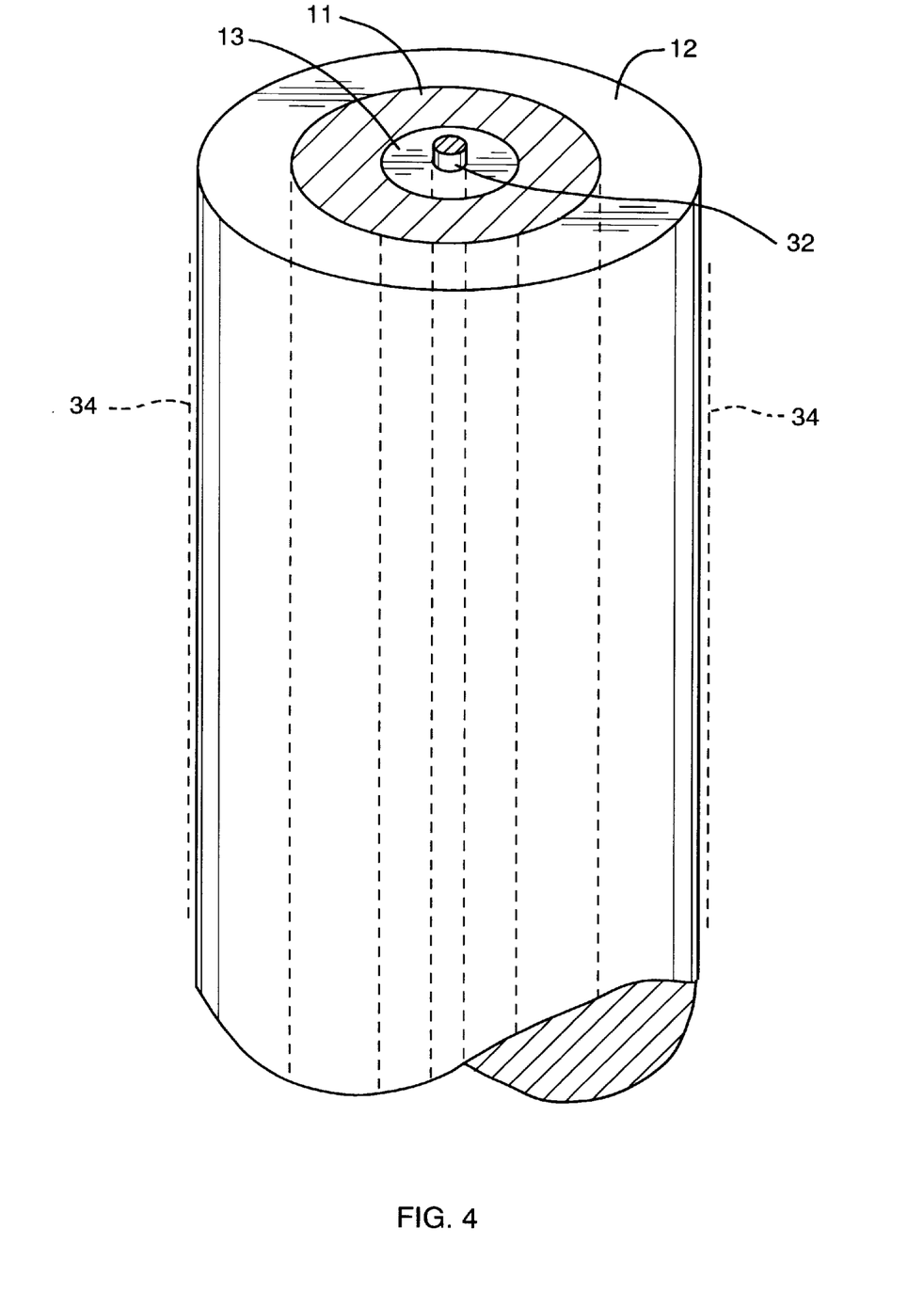
FIG. 4 is a schematic view of an alternate embodiment of the contractile apparatus of the present invention utilizing cationic, nonionic, and anionic polymer hydrogels, wrapped about a conductive core and coated with a conductive material to form a substantially cylindrical rod.

While the invention contemplates practice in the form of sheets, the construction may also take the form of rods or fibers. Referring now to FIG. 4, an embodiment utilizing a cylindrical rod is shown. In this embodiment, a conductive core 32 is coated with layers of a cationic hydrogel 13, a nonionic hydrogel 11 and an anionic hydrogel 12 respectively and includes an exterior conductive coating 34 that acts as the cathode. Conductive core 32 is placed in electrical communication with conductive coating 34. As was the case with respect to the embodiments of FIG. 1 and 2, passing a current through conductor the conductors, here core 32 and coating 34, results in a contraction or relaxation response appropriate to the polarity of the electric current. In some embodiments, core 32 is a flexible platinum wire that is wound to form an extension spring-like member, while other embodiments utilize cores made from different materials and having different configurations.

Figure 5A:
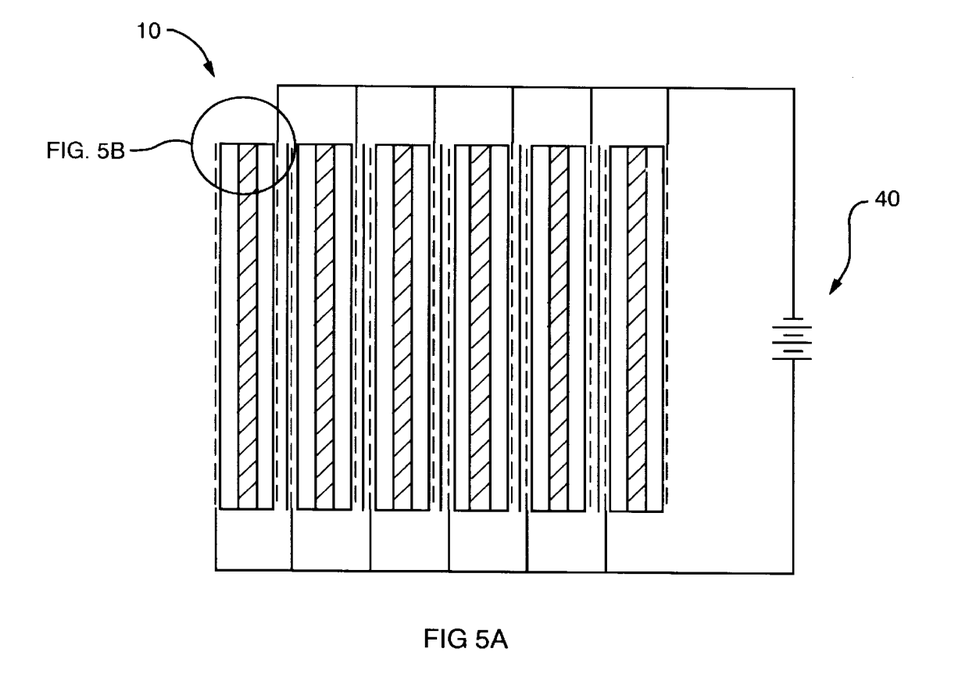
FIG. 5 is a schematic view of an alternate embodiment of the contractile apparatus of the present invention utilizing a plurality of polymer composites.
Figure 5B:
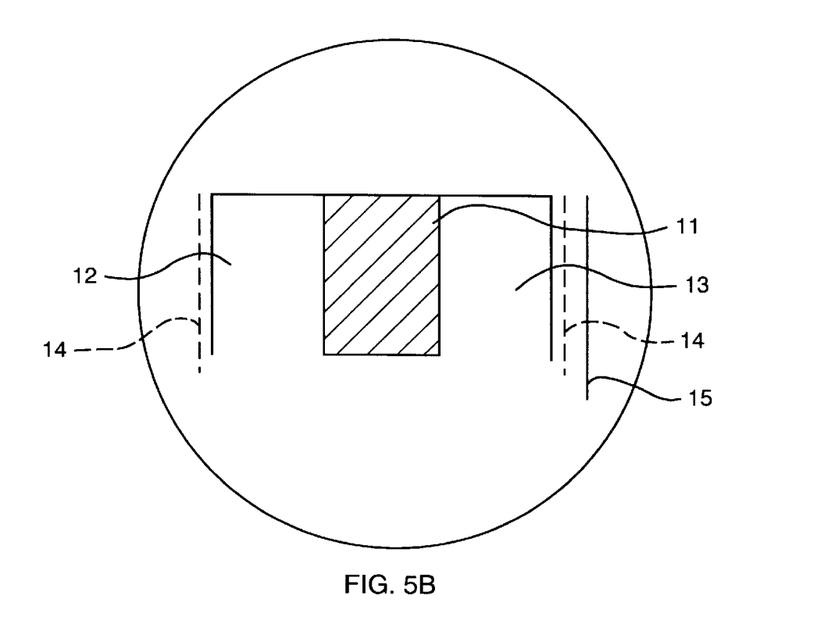

While the invention is described as being of a discrete number of layers, devices made from it may contain multiple sheets or bundles of fibers each of which are comprised of the functional layers described above. As shown in FIG. 5, such an embodiment would include a plurality of composites 10 in common electrical connection to a power source 40 and with each composite 10 separated from one another by an electrically insulating layer 15 such that the passing of a current through the flexible connection would effect a simultaneous migration of ions in each of the composites. In these embodiments, it is preferred that the composites 10 be connected in parallel such that each composite 10 contracts simultaneously. However, in circumstances where a more gradual contraction is desired, a combination of parallel and series circuits may be utilized. In either event, the use of multiple composites allows many very thin composites 10 to be used, speeding the rate of contraction while providing adequate strength due to the distribution of force load across the composites 10.

Although the present invention has been described in considerable detail with reference to certain preferred versions thereof, it is understood that other versions would be readily apparent to those of ordinary skill in the art. Therefore, the spirit and scope of the appended claims should not be limited to the description of the preferred versions contained herein.

What is claimed is:

1. A contractile apparatus comprising:
   an electrical conductor;
   a polymer composite in electrical communication with said conductor, said polymer composite comprising;
   a nonionic polymer hydrogel containing a soluble ionic salt; and
   an ionic polymer hydrogel in intimate contact with said nonionic polymer hydrogel;
   means for passing a first electric current of predetermined polarity through said electrical conductor to said polymer composite to cause said soluble salt in said nonionic polymer hydrogel to pass ions to said ionic polymer hydrogel resulting in a contraction of said ionic polymer hydrogel; and means for passing a second electrical current of predetermined and opposite polarity to the polarity of said first electrical current through said electrical conductor to said polymer composite to cause said ions from said ionic polymer hydrogel to pass to said soluble salt in said nonionic polymer hydrogel resulting in a relaxation of said ionic polymer hydrogel; wherein both of said means result in two-way migration of said ions in said polymer composite.

2. The contractile apparatus as claimed in claim 1 further comprising a second ionic polymer hydrogel in intimate contact with said nonionic polymer hydrogel.

3. The contractile apparatus as claimed in claim 2 wherein said ionic polymer hydrogel is a cationic polymer hydrogel and wherein said second polymer hydrogel is an anionic polymer hydrogel.

4. The contractile apparatus as claimed in claim 3 wherein said soluble salt comprises a cation producing salt and an anion producing salt.

5. The contractile apparatus as claimed in claim 1 wherein said polymer composite is formed into a substantially cylindrical rod comprising a conductive core, a layer of said nonionic polymer hydrogel disposed about said core, a layer of said ionic polymer hydrogel disposed about said layer of nonionic polymer hydrogel, and a conductive coating disposed about said layer of ionic polymer hydrogel.

6. The contractile apparatus as claimed in claim 5 further comprising a second layer of ionic polymer hydrogel disposed between said conductive core and said nonionic polymer hydrogel and wherein one ionic polymer hydrogel is a cationic polymer hydrogel and another ionic polymer hydrogel is an anionic polymer hydrogel.

7. The contractile apparatus as claimed in claim 1 further comprising a colorimetric device to monitor a concentration of said soluble ionic salt.

8. The contractile apparatus as claimed in claim 7 further comprising a controller for controlling the means for passing the first and second electrical current to said polymer composite based upon said concentration of said soluble ionic salt.

9. The contractile apparatus as claimed in claim 1 further comprising a strain gauge to monitor a length of said polymer composite.

10. The contractile apparatus as claimed in claim 9 further comprising a controller for controlling the means for passing the first and second electrical current to said polymer composite based upon said length of said polymer composite.

11. The contractile apparatus as claimed in claim 1 further comprising a plurality of polymer composites and wherein said electrical conductor is in electrical communication with each of said plurality of polymer composites such that each of said polymer composites may be controlled substantially simultaneously.

12. A contractile apparatus comprising:
    an electrical conductor;
    a polymer composite in electrical communication with said conductor, said polymer composite comprising;
    a nonionic polymer hydrogel containing a soluble ionic salt; and
    an ionic polymer hydrogel in intimate contact with said nonionic polymer hydrogel;
    a measuring device to measure the state of said polymer composite;
    means for passing a first electric current of predetermined polarity passed through said electrical conductor to said polymer composite to cause said soluble salt in said nonionic polymer hydrogel to pass ions to said ionic polymer hydrogel resulting in a contraction of said ionic polymer hydrogel; and means for passing a second electric current of predetermined and opposite polarity to the polarity of said first electric current through said electrical conductor to said polymer composite to cause said ions from said ionic polymer hydrogel to pass to said soluble salt in said nonionic polymer hydrogel resulting in a relaxation of said ionic polymer hydrogel; wherein both of said means result in two-way migration of said ions in said polymer composite.

13. The contractile apparatus as claimed in claim 12 further comprising a controller for controlling the means for passing the first and second electrical current to said polymer composite based upon said state of said polymer composite.

14. The contractile apparatus as claimed in claim 13 further comprising a second ionic polymer hydrogel in intimate contact with said nonionic polymer hydrogel.

15. The contractile apparatus as claimed in claim 14 wherein said ionic polymer hydrogel is a cationic polymer hydrogel and wherein said second polymer hydrogel is an anionic polymer hydrogel.

16. The contractile apparatus as claimed in claim 15 wherein said soluble salt comprises a cation producing salt and an anion producing salt.

17. The contractile apparatus as claimed in claim 13 wherein said polymer composite is formed into a substantially cylindrical rod comprising a conductive core, a layer of said nonionic polymer hydrogel disposed about said core, a layer of said ionic polymer hydrogel disposed about said layer of nonionic polymer hydrogel, and a conductive coating disposed about said layer of ionic polymer hydrogel.

18. The contractile apparatus as claimed in claim 17 further comprising a second layer of ionic polymer hydrogel disposed between said conductive core and said nonionic polymer hydrogel and wherein one ionic polymer hydrogel is a cationic polymer hydrogel and another ionic polymer hydrogel is an anionic polymer hydrogel.

19. The contractile apparatus as claimed in claim 13 wherein said measuring device is a calorimetric device to monitor a concentration of said soluble ionic salt and wherein said controller controls the means for passing the first and second electrical current to said polymer composite based upon said concentration of said soluble ionic salt.

20. The contractile apparatus as claimed in claim 13 wherein said measuring device is a strain gauge to monitor a length of said polymer composite and wherein said controller controls the means for passing the first and second electrical current to said polymer composite based upon said length of said polymer composite.

* * * * *